United States Patent
Goss et al.

(10) Patent No.: US 10,416,528 B2
(45) Date of Patent: Sep. 17, 2019

(54) SENSOR LINE, MEASURING ARRANGEMENT AND METHOD FOR DETECTING AN AMBIENT VARIABLE

(71) Applicant: LEONI KABEL GMBH, Nuremberg (DE)

(72) Inventors: Sebastian Goss, Roth (DE); Sergey Intelman, Nuremberg (DE)

(73) Assignee: LEONI Kabel GmbH, Nuremberg (DE)

( * ) Notice: Subject to any disclaimer, the term of this patent is extended or adjusted under 35 U.S.C. 154(b) by 0 days.

(21) Appl. No.: 15/874,190

(22) Filed: Jan. 18, 2018

(65) Prior Publication Data

US 2018/0203323 A1 Jul. 19, 2018

(30) Foreign Application Priority Data

Jan. 18, 2017 (DE) .................. 10 2017 200 755

(51) Int. Cl.
| | |
|---|---|
| *G02F 1/225* | (2006.01) |
| *G01K 3/00* | (2006.01) |
| *G01K 11/32* | (2006.01) |
| *G08C 23/06* | (2006.01) |
| *G01K 7/16* | (2006.01) |
| *G01K 7/34* | (2006.01) |

(Continued)

(52) U.S. Cl.
CPC ............. *G02F 1/2257* (2013.01); *G01K 3/00* (2013.01); *G01K 7/16* (2013.01); *G01K 7/343* (2013.01); *G01K 11/18* (2013.01); *G01K 11/32* (2013.01); *G01K 11/3206* (2013.01); *G08C 23/06* (2013.01); *H04Q 9/00* (2013.01); *G01K 2003/145* (2013.01); *G02B 6/2821* (2013.01); *G02B 6/2848* (2013.01); *G02B 6/4415* (2013.01); *H01B 1/026* (2013.01); *H01B 7/324* (2013.01)

(58) Field of Classification Search
None
See application file for complete search history.

(56) References Cited

U.S. PATENT DOCUMENTS

| | | | | |
|---|---|---|---|---|
| 3,936,142 A | * | 2/1976 | Kersten .................. | G02B 6/255 385/39 |
| 4,325,604 A | * | 4/1982 | Witte ................... | G02B 6/2804 385/25 |

(Continued)

FOREIGN PATENT DOCUMENTS

| | | |
|---|---|---|
| DE | 102013227051 A1 | 6/2015 |
| DE | 102015009407 A1 | 1/2017 |

(Continued)

*Primary Examiner* — Tina M Wong
(74) *Attorney, Agent, or Firm* — Laurence A. Greenberg; Werner H. Stemer; Ralph E. Locher (57) ABSTRACT

A sensor line, a measuring arrangement and a method detect a change in an ambient variable. The sensor line serves for detecting a change in an ambient variable, in particular the temperature. The sensor line has a first optical waveguide, a second optical waveguide and also a material that changes its transparency depending on the value of the ambient variable. The material is positioned between the first optical waveguide and the second optical waveguide in such a way that light from the first optical waveguide is able to be coupled into the second optical waveguide in an event of a change in the transparency.

15 Claims, 4 Drawing Sheets

(51) Int. Cl.
*G01K 11/18* (2006.01)
*H04Q 9/00* (2006.01)
*H01B 1/02* (2006.01)
*H01B 7/32* (2006.01)
*G02B 6/44* (2006.01)
*G02B 6/28* (2006.01)
*G01K 3/14* (2006.01)

(56) References Cited

U.S. PATENT DOCUMENTS

| | | | | |
|---|---|---|---|---|
| 4,462,699 | A | * | 7/1984 | Shaw ................ G01D 5/32 356/43 |
| 4,738,511 | A | * | 4/1988 | Fling ............... G02B 6/2826 264/1.25 |
| 7,349,596 | B2 | * | 3/2008 | Anderegg ............ G02B 6/26 385/27 |
| 8,655,123 | B2 | * | 2/2014 | Donlagic ........... G01D 5/3538 385/12 |
| 2003/0118298 | A1 | * | 6/2003 | Matsuyama .......... G02B 6/443 385/110 |
| 2012/0063484 | A1 | * | 3/2012 | Goddard ........... G02B 6/12007 372/94 |
| 2015/0316424 | A1 | | 11/2015 | Bauco |
| 2016/0170141 | A1 | * | 6/2016 | Luo .................... H01S 5/141 385/14 |
| 2016/0290876 | A1 | * | 10/2016 | Koeppendoerfer .... G01K 7/343 |
| 2018/0097264 | A1 | | 4/2018 | Doerr et al. |
| 2018/0307118 | A1 | * | 10/2018 | Sciancalepore ........ G02F 1/395 |

FOREIGN PATENT DOCUMENTS

| | | |
|---|---|---|
| DE | 102015009409 A1 | 1/2017 |
| GB | 2404017 A | 1/2005 |
| JP | H01129127 A | 5/1989 |
| JP | H0968469 A | 3/1997 |
| WO | 2016169702 A1 | 10/2016 |

* cited by examiner

SENSOR LINE, MEASURING ARRANGEMENT AND METHOD FOR DETECTING AN AMBIENT VARIABLE

CROSS-REFERENCE TO RELATED APPLICATION

This application claims the benefit, under 35 U.S.C. § 119, of German patent application DE 10 2017 200 755.9, filed Jan. 18, 2017; the prior application is herewith incorporated by reference in its entirety.

BACKGROUND OF THE INVENTION

Field of the Invention

The invention relates to a sensor line for detecting an ambient variable. The invention furthermore relates to a measuring arrangement containing such a sensor line, and also to a method for detecting the ambient variable.

Detecting an ambient variable, primarily detecting temperature, is in widespread use technologically, for example for monitoring machines or else for monitoring electrical cables. In some instances, specific sensor cables are used for this purpose.

By way of example, the temperature-dependent resistance of an electrical conductor can be utilized for temperature monitoring. A correspondingly configured sensor cable thus makes use of the fact that the electrical resistance changes as the temperature changes and a changed current is thus measured at the sensor cable. However, this variant of temperature detection relates exclusively to a change in temperature over the total length of the sensor cable. It is virtually impossible to detect a locally occurring change in temperature (so-called "Hot-Spot") with this measuring arrangement since a local change in the resistance relative to the total length of the sensor line and thus also in the resistance results only in a small change in current, which does not permit an unambiguous statement and/or is detectable only using complex and expensive current measuring instruments.

A measuring arrangement for detecting a change in temperature with the aid of a sensor cable can be gathered from published, non-prosecuted German patent application DE 10 2013 227 051 A1, corresponding to U.S. patent publication No. 2016/0290876. The measuring arrangement contains a sensor cable having a first signal conductor and a feed-in unit, which feeds a measurement signal into the signal conductor during operation. The measurement signal is fed symmetrically into two signal conductors. The measurement signal fed in is evaluated with the aid of an evaluation unit. The first signal conductor is surrounded by insulation such as a dielectric having a first temperature-dependent dielectric constant. Detecting a change in temperature makes use of the fact, inter alia, that signal propagation times in conductors provided with an insulation composed of a temperature-dependent dielectric vary on account of a change in temperature. The signal propagation times for given cable lengths at room temperature are present as reference propagation times. A change in temperature can therefore be ascertained and analyzed. The measuring arrangement can also detect "Hot-Spots" since this leads to a local change in the dielectric constant and thus to a local defect at which the signal is at least partly reflected, as a result of which a changed signal propagation time is obtained.

The sensor cable and the measuring arrangement that can be gathered from published, non-prosecuted German patent application DE 10 2013 227 051 A1 are complex and cost-intensive on account of the design and evaluation of the measurement signals.

SUMMARY OF THE INVENTION

Taking this as a departure point, the invention is based on the object of specifying a sensor line, a measuring arrangement and a method with the aid of which a change in an ambient variable, preferably the temperature, can be detected in a simple manner.

The object directed to the sensor line is achieved according to the invention by a sensor line for detecting the change in an ambient variable. The sensor line contains a first and a second optical waveguide and also a material having a light transmissivity that varies depending on the value of the ambient variable. In this case, the material is positioned between the first optical waveguide and the second optical waveguide in such a way that it enables the light to be coupled from the first optical waveguide into the second optical waveguide depending on the value of the ambient variable. In this case, the coupling-in takes place in a radial direction, i.e. transversely with respect to the longitudinal extent of the sensor line and the optical waveguides. In this case, the two optical waveguides extend over the entire length of the sensor line.

In this case, the detection of the change in the ambient variable is based on an optical measurement using two optical waveguides and makes use of the specific property of the material that its transparency changes when the value of the ambient variable changes. As a result of the increased transparency, light passes from the first optical waveguide into the second optical waveguide and can be correspondingly evaluated. In particular, complex signal processing is not required here since, for example, it is merely necessary to check whether light propagates in the second optical waveguide.

In this case, the first optical waveguide is generally configured in such a way that radial emergence of light is made possible, such that this emerging light can enter the second optical waveguide. The first optical waveguide therefore contains in particular an optical fiber from which the light can emerge laterally. This fiber is also referred to hereinafter as lateral light fiber.

The second optical waveguide preferably likewise contains an optical fiber, which is referred to as a "collector fiber" since it traps the light emerging from the lateral light fiber. In this case, the collector fiber is preferably likewise configured as a lateral light fiber.

The sensor line enables a change in the ambient variable to be detected in a simplified manner. A particular advantage of this sensor line should be seen in the fact that even a change in the ambient variable that only occurs locally can be reliably detected.

The material is preferably configured to the effect that its transparency changes abruptly. In this case, abruptly is understood to mean, in particular, that a significant change in the transparency, that is to say the light transmissivity, takes place for example when a defined transition value for the ambient variable is reached and exceeded. Significant change is understood to mean for example a change in the transparency by at least 30%, especially by at least 50% and preferably by at least 75% (in the case of a transparency range of 0% (totally opaque) to 100% (totally transparent)). With the abrupt change in transparency, the light from the first optical waveguide is also coupled abruptly into the second optical waveguide and thus also leads to an abrupt increase in the light propagating in the second optical waveguide. The intensity of the light propagating in the second optical waveguide increases for example to at least 1.5-fold, preferably to at least two-fold or three-fold. One advantage should be seen in the fact that this abrupt change has a binary character that is simple to detect.

Preferably, the sensor line is configured for thermal monitoring. The transparency of the material is therefore preferably temperature-dependent. In particular, when a specific temperature value, the so-called "transition temperature", is exceeded, the transparency of the material changes and enables the light from the first optical waveguide to be radially coupled abruptly into the second optical waveguide. This temperature-dependent change in the transparency of the material affords the advantage that a simple and interference-immune measurement condition is provided. Since the change in transparency also takes place at local points on the lateral light fiber, the sensor line described makes it possible to detect instances of local heating (so-called "Hot-Spot").

Preferably, the material contains a transparent thermoplastic into which thermo chromic pigments are introduced. In this case, the thermo chromic pigments determine the transparency of the material. They change their transparency depending on the temperature. This preferably takes place at a defined transition temperature. Such thermo chromic pigments are commercially available in principle. A desired transition temperature of the material is set via the choice of pigments. The particular advantage of the thermo chromic pigments is that their transition temperature is staggered in a commercially available manner for example in 2° C. steps (e.g. 58° C., 60° C., 62° C., etc.). Consequently, the sensor conductor can be adapted very accurately to its environment of use.

The transition temperature of the material is preferably set to a value of between 40° C. and 90° C., in particular to a value of between 50° C. and 70° C. Since the sensor line is preferably used for thermal monitoring, this temperature range chosen by way of example offers not only a technical protection against overheating but also thermal touch safety for the end user.

The concentration of the thermo chromic pigments, relative to the total mass of the material, is preferably between 1% by weight and 10% by weight, in particular between 2% by weight and 6% by weight.

In a preferred development, such a sensor line contains a common sheathing, which surrounds the first optical waveguide and the second optical waveguide and which is configured in a reflective fashion. The advantage of such a configuration of the sensor line is that the radially emitted light from the first optical waveguide which is not directly coupled into the second optical waveguide is reflected at said sheathing back into the second optical waveguide and thus increases the measurement sensitivity thereof.

In order to achieve a high reflectance (ratio of reflected to incident intensity) of the light emitted radially by the lateral light fiber, the common sheathing is preferably configured as a metal film. This is understood to mean a pure metal film and also a metal-clad plastics film. Metals often have reflectances of, for example, more than 90%.

In an expedient development, at least the first optical waveguide preferably contains an extruded sheath composed of the material. In this case, the optical waveguide having the sheath is preferably manufactured by a conventional sheath extrusion. Use is therefore made of standard methods for cost-effective manufacture.

Particularly in order to achieve an improved resistance to interference, in accordance with one preferred development the second optical waveguide contains a sheath composed of the material. By virtue of this development, it is possible for light to be coupled into the second optical waveguide only if the transition temperature is reached or exceeded.

In these embodiment variants with the sheath composed of the material, the optical waveguides each preferably contain an optical fiber that is free of cladding at least over parts of the circumference or completely, such that the reflection within the optical waveguide is determined by the sheath and the transparency thereof.

The optical fiber is preferably a polymer optical fiber (POF) or alternatively a glass fiber.

In accordance with one preferred configuration, the two optical waveguides are twisted together. This is advantageous particularly in the configuration with the fibers surrounded by the material. As a result, the two optical waveguides are held against one another in a defined manner, such that a reliable coupling into the collector fiber takes place. Moreover, it is possible to have recourse to conventional manufacturing methods.

Preferably, at least one of the optical waveguides, with preference at least the first optical waveguide, and in particular both optical waveguides is/are configured in such a way that the optical fiber of the respective optical waveguide contains a cladding for guiding light as well as possible in the longitudinal direction of the fiber, wherein only part of the fiber is free of cladding. In this case, the material adjoins the part which is free of cladding. The advantage of this development is the use of standard optical fibers, which exhibit a cost saving in conjunction with very good light wave guiding. Through the part free of cladding, the coupling of light into the collector fiber and thus the functioning of the sensor line are ensured.

In a supplementary development, the two optical waveguides are embedded into the material. The manufacturing outlay can be reduced as a result. By way of example, the first optical waveguide and the second optical waveguide are surrounded by the material, in particular in the context of an extrusion, in a common manufacturing step.

Expediently, the sensor line contains an outer protective sheath. The sensor line can thus be used even in areas where it is exposed to environmental influences, especially adverse ambient conditions.

Such a sensor line is preferably fitted in a cable to be monitored. On account of the configuration of the sensor line, the latter is integrated in particular as an additional "core" into a cable. It thus affords the possibility of the monitoring of the cable itself.

In accordance with one particularly preferred configuration, the sensor line is part of a charging cable, preferably for motor vehicles. In this case, charging cable is understood to mean, in particular, a cable configured for transmitting currents in the region of at least 16 A, in particular of at least 50 A or at least 100 A and for example up to 600 A. Preferably, the cable is configured for transmitting currents in the range of between 300 A and 500 A. Such charging currents occur for example in so-called (DC) superchargers.

The high currents during the charging process result in the cable heating up. Temperature monitoring ensures that a specific temperature is not exceeded. In particular, thermal touch protection is achieved as a result.

Such a charging cable contains at at least one end, in particular, a charging connector for connection to a mating connector at a charging station or on a motor vehicle. Charging cables for electric or hybrid vehicles containing electric traction motors usually contain standardized charging connectors. Relevant standards in this respect are currently IEC 62196-1 (type 2 connectors), SAE J1772 or IEC 62196-2 (type 1 connectors). Therefore, the charging cable is provided at least at one end with a standardized charging connector for example in accordance with abovementioned or (future) comparable standards.

The temperature monitoring of charging cables for motor vehicles is becoming increasingly important generally in particular for charging processes using direct current (DC). These charging processes have a target current intensity of 500 A. Firstly, with higher currents there is an increase in the thermal loading and thus the technical stressing of the cores; secondly, it is necessary to ensure thermal touch protection vis-à-vis the end user preferably to the effect that the end user can touch the cable at any time without incurring any physical injury from this.

The preferred variant with the defined transition temperature therefore affords, besides the possibility of thermal monitoring, in particular the advantage of thermal touch protection for the end user.

The object is furthermore achieved according to the invention by a measuring arrangement and also a method for detecting an ambient variable. In this case, the measuring arrangement contains the sensor line described above, a feed-in unit for feeding light into the first optical waveguide, a receiving unit for receiving light from the second optical waveguide, and an evaluation unit, which is configured for evaluating the light received by the receiving unit and outputs a signal depending on the received intensity.

In this case, the feed-in unit comprises for example a light emitting diode (LED) for feeding the light into the first optical waveguide.

The receiving side is preferably configured in such a way that it contains photodiodes for receiving the light that is coupled from the first optical waveguide into the second optical waveguide.

In accordance with a first variant, the feed-in unit of the measuring arrangement is chosen in such a way that the light is fed in only at one end of the optical waveguide.

For a higher light intensity within the lateral light fiber, in accordance with a second variant the feed-in unit is preferably configured in such a way that the light is fed in at both ends of the first optical waveguide. The particular advantage of feeding in on both sides is the realization of a more constant and larger quantity of light fed in. In the event of the transition temperature being exceeded and thus a change in the transparency of the material, a more distinct coupling of the light into the collector fiber takes place.

In accordance with one expedient configuration, in particular supplementarily the receiving unit is also connected to the second optical waveguide at both ends, that is to say that the emerging light is received at both ends of the optical waveguide. This configuration has the advantage that the reception sensitivity for the light coupled from the first optical waveguide into the second optical waveguide is increased.

In a preferred configuration, the measuring arrangement is configured for detecting the position of a local defect, in particular a so-called Hot Spot. In this case, light from the first optical waveguide is coupled into the second optical waveguide only at the local defect for example as a result of the transition temperature being exceeded.

For detecting the position, the evaluation unit here preferably has recourse to stored and/or calculated location-dependent intensity profiles. This is based on the consideration that on account of damping of the light in the respective optical waveguide—especially when light is coupled in only on one side—a defined intensity value should be expected for each position. Depending on the position of the defect, therefore, a defined fraction of the defined intensity value is coupled into the second optical waveguide. Finally, the fraction of the defined intensity value is in turn defined and damped in a path-length-dependent manner within the second optical waveguide on the path section to the receiving unit. From the received intensity—given a known intensity fed in, known damping and known coupling between the two optical waveguides—the position of the defect can therefore be deduced.

Alternatively or supplementarily, for accurate detection provision is preferably made for receiving light on both sides in the second optical waveguide. The position of the local defect is then deduced from the intensities received at the two ends. In particular, the ratio of the intensities indicates a measure of the position of the local defect. This is based in turn on the utilization of the damping. If the coupling of light (that is to say the defect) into the second optical waveguide takes place exactly in the center of the optical waveguide, then the light experiences the same damping in both directions. If the defect is shifted to one end, the received intensity increases there. In order to determine the position of the defect, recourse is had in turn to a mathematical algorithm or characteristic values stored in the form of a table, for example.

In an expedient supplementation, the evaluation unit is configured in such a way that it outputs a signal when a predefined limit value of the received intensity is exceeded, the signal serving for further processing.

In a preferred development, the measuring arrangement is configured in such a way that it contains a control device configured in such a way that a charging current and/or a cooling power are/is controlled depending on the signal. This development relates in particular to the field of E-mobility when charging electrically driven vehicles. The control, and in particular closed-loop control, of the charging current ensures the highest possible charging current while taking account of thermal touch protection and/or overload protection. Alternatively or supplementarily, in the case of temperature-regulated charging cables, the cooling power is controlled by closed-loop control. The charging current can be kept constant as a result. Such temperature-regulated cables have an internal cooling, in particular. For this purpose, at least one flow channel through which a cooling medium flows during operation is typically integrated in the cable. The cooling medium is guided in circulation, for example. At the end of the cable, the cable is connected to a cooling medium supply. By means of this cooling medium supply, the cooling power is controlled, for example by the control of the temperature and/or the flow rate of the cooling medium.

Specifically, the transition temperature of the material is chosen as a predefined limit value for signal outputting. As a result, a closed-loop control is realized to the effect that the temperature loading of the charging cable that results as a consequence of the flowing charging current does not become excessively large and does not exceed a defined value. The closed-loop control is carried out by means of a set point-actual value comparison within a control loop. The controlled variable is the temperature. This serves to protect the charging cable against thermal damage and to ensure, in the context of end user safety, that there is no risk of burns for the end user upon touching the cable.

The advantages and preferred configurations presented with regard to the sensor line are analogously applicable to the measuring arrangement and also to the method, and vice versa.

Other features which are considered as characteristic for the invention are set forth in the appended claims.

Although the invention is illustrated and described herein as embodied in a sensor line, a measuring arrangement and a method for detecting an ambient variable, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

In the figures, identically acting parts are illustrated with the same reference signs.

Figure 1:
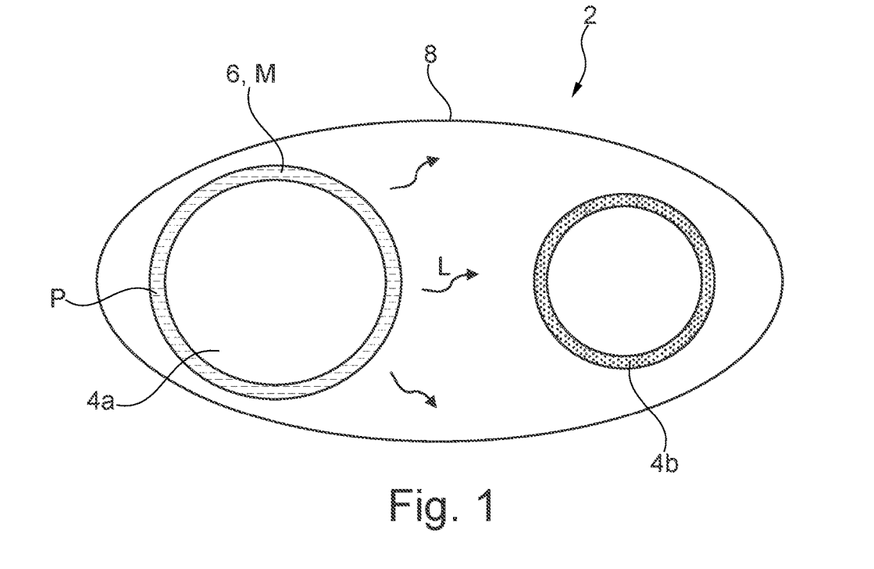
FIG. 1 is a diagrammatic, cross-sectional view of a sensor line in accordance with a first variant of the invention.

Referring now to the figures of the drawings in detail and first, particularly to FIG. 1 thereof, there is shown a sensor line 2 for detecting an ambient variable which has a first optical waveguide 4a and also a second optical waveguide 4b. The first optical waveguide 4a has a sheath 6 composed of a material M that changes its transparency depending on the value of the ambient variable. The first optical waveguide 4a is preferably realized as an optical fiber, in particular as a so-called lateral light fiber, such that the light L fed into the first optical waveguide 4a can be emitted radially. By virtue of the sheath 6, the light is reflected at the interface layer between the lateral light fiber and the sheath, such that light can propagate in the longitudinal direction of the optical waveguide 4a as long as the sheath is not transparent.

The second optical waveguide 4b is preferably likewise configured as an optical fiber. In this case, it is configured in such a way that light L can penetrate radially from outside.

The fibers are polymer fibers (POF), in particular. They are configured for example as commercially available PU fibers.

The two optical waveguides 4a, 4b are furthermore surrounded by a common sheathing 8, which is configured such that it is reflective in the direction of the optical waveguides 4a, 4b. Preferably, the sheathing 8 itself is configured as a metal film or contains a metal layer on its inner side. Preferably, the sheathing 8 has a reflectance of up to more than 90% for light L emerging from the first optical waveguide 4a.

The sensor line is preferably used for monitoring the temperature, in particular of a cable. The ambient variable is the temperature. In the event of a predefined temperature value (the so-called "transition temperature") being exceeded, the material M changes its transparency from nontransparent to transparent. This enables the light from the first optical waveguide 4a to be coupled into the second optical waveguide 4b. The change in transparency is made possible by so-called thermochromic pigments P that are admixed with the material M during the production thereof. By virtue of the reflective sheathing 8, a high proportion of the light L is coupled into the second optical waveguide 4b.

In addition, the sensor line 2 is preferably configured for determining and localizing locally occurring changes in temperature (so-called "Hot Spots"). This "Hot-Spot" detection is made possible on account of the thermochromic pigments P, which can change their transparency locally, for example. Analogously thereto, the light L is coupled into the second optical waveguide 4b in particular locally at this transparent location of the sensor line 2.

Figure 2:
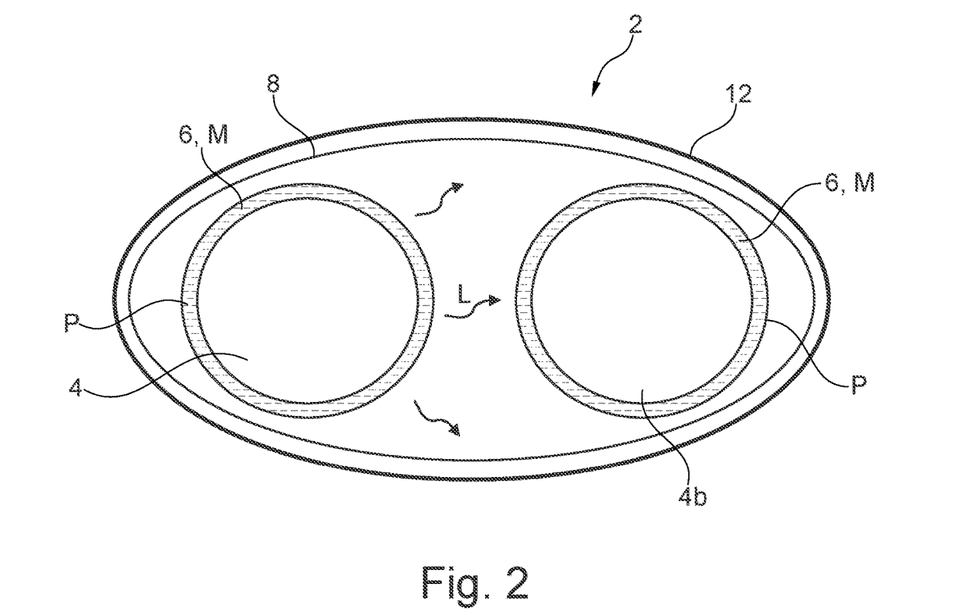
FIG. 2 is a cross-sectional view of the sensor line in accordance with a second variant of the invention.

In the case of the configuration in accordance with FIG. 2, the second optical waveguide 4b is also surrounded by a sheath 6 composed of the material M. The two optical waveguides 4a, 4b are preferably configured identically, in particular as lateral light fibers. The advantage of this configuration is the reduced susceptibility of the second optical waveguide 4b to interference vis-à-vis light L not coupled in from the first optical waveguide 4a. On account of the sheath 6 around the second optical waveguide 4b, light L is coupled into the latter only after the exceedance of the transition temperature and the associated change in the transparency of the material M. As in the case of the variant in FIG. 1, too, a common sheathing 8 is arranged. The latter is additionally surrounded by an outer protective sheath 12. The latter is preferably implemented in all variants.

Figure 3A:
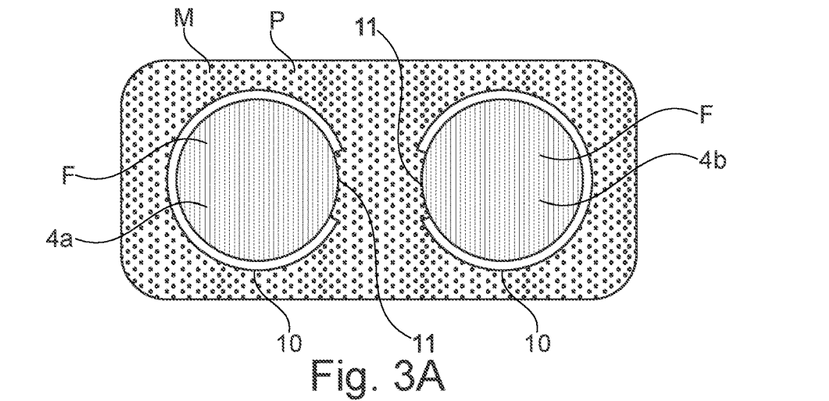
FIGS. 3A-3C are sectional views of the sensor line of a third variant in simplified basic illustrations for elucidating a coupling of light from a first optical waveguide into a second optical waveguide.
Figure 3B:
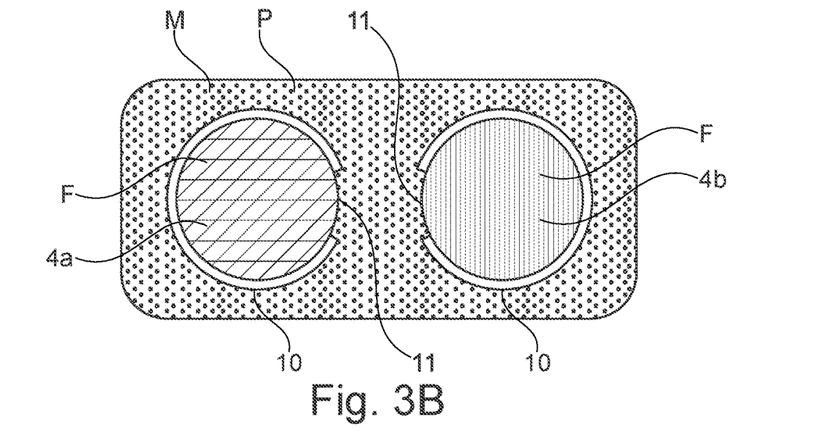
Figure 3C:
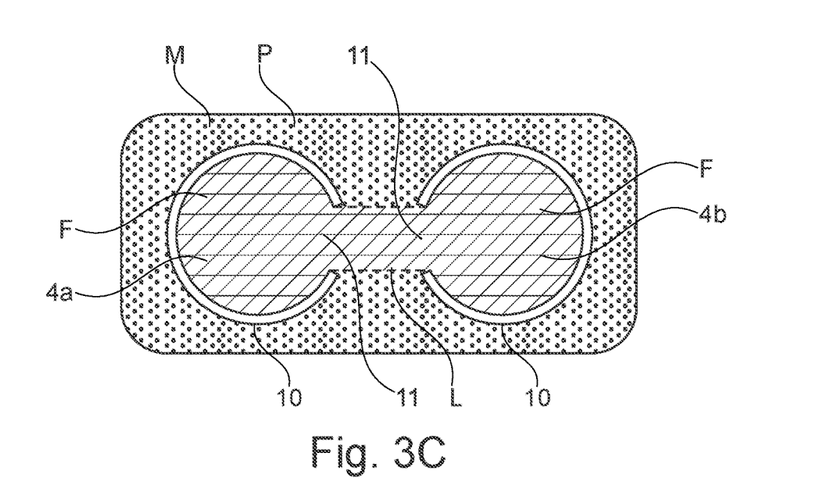

FIGS. 3A-3C illustrate the cross sections of a third configuration variant for elucidating the coupling of the light L from the first optical waveguide 4a into the second optical waveguide 4b. This variant differs from those from FIG. 1 and FIG. 2 to the effect that the first optical waveguide 4a and the second optical waveguide 4b contain an optical fiber F, in particular a polymer optical fiber F, and a cladding 10, wherein a part 11 of the fiber F is free of cladding 10. Both optical waveguides 4a, 4b are arranged alongside one another. In addition, the material M adjoins at least the part 11 that is free of cladding 10. In the case of the preferred configuration in FIGS. 3A to 3C, the two optical waveguides 4a, 4b are embedded in the material M, that is to say are in each case completely surrounded by the latter.

The cladding 10 ensures the best possible light guiding in the longitudinal direction of the respective optical waveguide 4a, 4b. A radial emergence of light L is prevented by the cladding. Light L can therefore emerge only in the cladding-free parts 11. In this case, the cladding-free part 11 extends in particular only over less than half of the circumference, and in the exemplary embodiment for instance over one quarter or one fifth of the circumference. In the longitudinal direction, the cladding-free part 11 preferably extends over the entire length of the respective optical waveguide 4a, 4b.

Preferably—as illustrated—the two cladding-free parts 11 of the two optical waveguides 4a, 4b are directed toward one another and are therefore situated opposite one another. This thereby realizes a short path section for coupling the light L from the first optical waveguide 4a into the second optical waveguide 4b.

This coupling-in of the light L is schematically illustrated in the three illustrations of FIGS. 3A-3C. FIG. 3A shows the sensor line 2 in the quiescent state. Neither the first optical waveguide 4a nor the second optical waveguide 4b is guiding light L. In FIG. 3B, light L is fed into the first optical waveguide 4a. However, the value of the temperature in the region of the sensor line 2 is below the transition temperature. The material M is nontransparent in this state and thus "replaces" the cladding 10 at the cladding-free part 11. Consequently, light L from the first optical waveguide 4a is not coupled into the second optical waveguide 4b.

The behavior of the sensor line when the transition temperature is exceeded is illustrated in FIG. 3C. When the transition temperature is exceeded, the material M changes its transparency from nontransparent to transparent and enables the light L from the first optical waveguide 4a to be coupled into the second optical waveguide 4b.

Figure 4A:
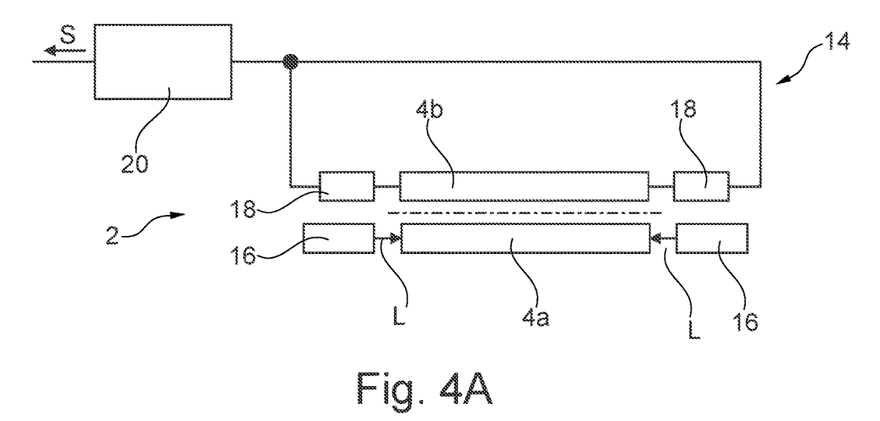
FIG. 4A is a simplified circuitry illustration of a measuring arrangement.

FIG. 4A shows a simplified circuitry illustration of a measuring arrangement 14. The measuring arrangement includes a feed-in unit 16 for feeding light L into the first optical waveguide 4a, a receiving unit 18 for receiving the light coupled in from the second optical waveguide 4b, and an evaluation unit 20 for evaluating the light received by the receiving unit and for outputting a signal S.

The feed-in unit 16 is configured in such a way that it is connected to the first optical waveguide 4a at both ends, that is to say that light L is fed in at both ends of the optical waveguide 4a during operation. Analogously thereto, the receiving unit 18 is configured in such a way that it is positioned at both ends of the second optical waveguide 4b, that is to say that light L which emerges at the two ends is detected at both ends. For this purpose, by way of example, a respective photodiode is arranged at both ends. The advantage of this configuration is that the sensitivity of the sensor line 2 is increased. The feeding of light into the first optical waveguide 4a at both ends preferably ensures a uniform illumination of the first optical waveguide 4a. This feeding-in of the light on both sides is based on the consideration that—independently of the position within the sensor line 2—an intensity of the light L that is as uniform as possible is ensured when the light L is coupled into the second optical waveguide 4b.

Alternatively, the measuring arrangement 14 is configured in such a way that the feed-in unit 16 feeds light L into the first optical waveguide 4a on one side and the second optical waveguide 4b has the receiving unit 18 at both ends. Such a configuration is illustrated in FIG. 4B.

Figure 4B:
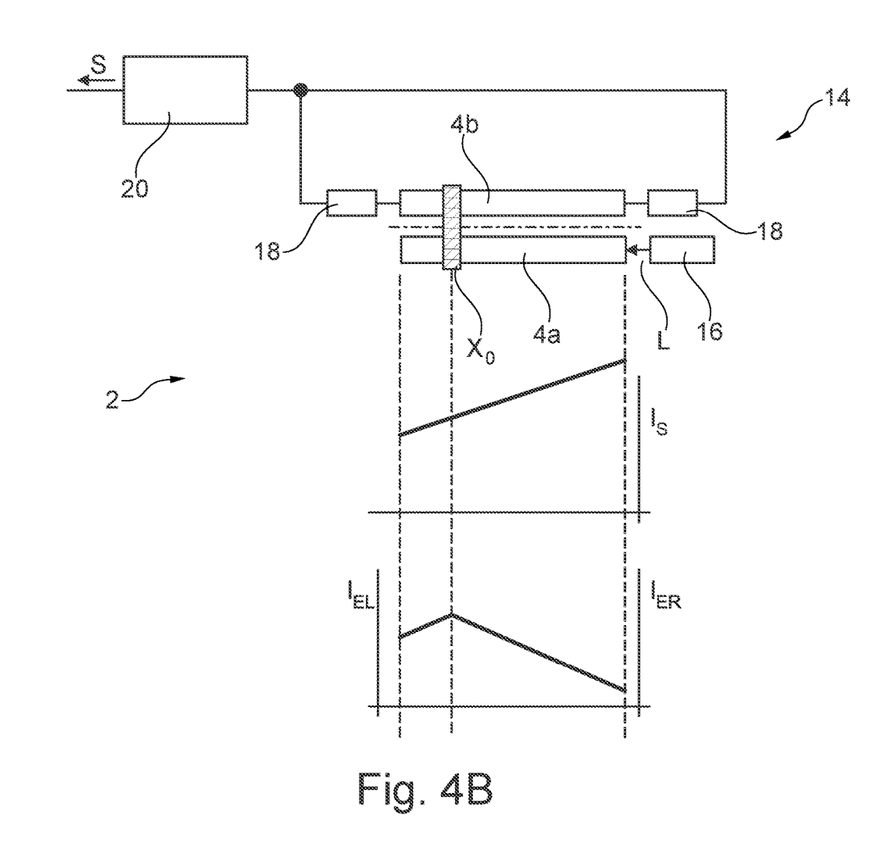
FIG. 4B is a circuit illustration similar to FIG. 4A supplemented by intensity profiles for illustrating the localization of a hot spot.

FIG. 4B additionally also illustrates an intensity profile for the intensity IS of the light coupled into the first optical waveguide 4a and an intensity profile for the intensity IE of the light coupled into the second optical waveguide 4b.

A localization of a Hot Spot X0 is made possible in particular with such a measuring arrangement 14. Light is coupled into the second optical waveguide 4b only at the position of the Hot Spot X0.

Owing to the damping, the intensity IS of the light fed into the first optical waveguide 4a decreases continuously, in particular linearly, as is illustrated in the upper intensity profile. At the location of the Hot Spot X0, a defined proportion of the intensity IS existing at this position is coupled into the second optical waveguide 4b. This coupled-in intensity IE propagates in the second optical waveguide 4b to both ends and in the process is likewise damped linearly, for example. At the two opposite ends, usually different intensities IEL (left-hand side) and IER (right-hand side) are then detected.

A receiver of the receiving unit 18 from which the Hot Spot X0 is at the smaller distance detects a higher intensity IEL of the light L. On account of this difference in the intensities IEL and IER at the two ends, the position of the Hot Spot X0 can be determined mathematically or else by comparison with characteristic values stored in a table, for example. In particular, an assignment of intensity ratios between IEL and IER to a position is carried out here. In the exemplary embodiment in FIG. 4B, the intensity IEL of the coupled-in light L at the left-hand receiver is higher than the intensity IER at the right-hand receiver. In this respect, a Hot Spot which occurs at the left-hand edge of the sensor line 2 is involved.

The received light L or a reception signal correlated with the intensity of the received light L is forwarded to the evaluation unit 20 for evaluation, where a signal S is output depending on the intensity of the light.

Figure 5:
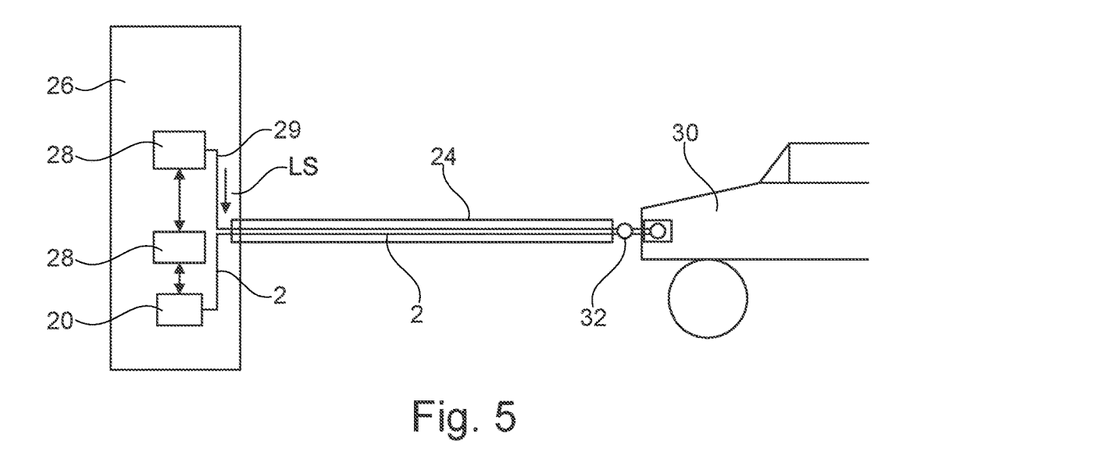
FIG. 5 is a simplified illustration of a charging system for charging a motor vehicle.

FIG. 5 illustrates a charging system for charging a motor vehicle 30 in a grossly simplified fashion. In this case, the sensor line 2 is integrated into a charging cable 24 for the thermal monitoring of the charging cable 24.

The charging system contains a charging column 26 having a charging device 28 for charging a battery (not illustrated in more specific detail here) of a motor vehicle 30 via the charging cable 24 with a charging current LS. For this purpose, the charging cable 24 has a charging connector 32 on one side.

The charging connector 32 preferably has a standardized plug connection. Besides the charging current line 29 carrying the charging current LS, the charging cable 24 fitted to the charging connector 32 also contains the sensor line 2. Preferably, the charging cable is realized in such a way that it comprises a parallel arrangement of charging current line 29 and sensor line 2. This configuration of the charging cable 24 as illustrated in FIG. 5 has the advantage that even locally occurring changes in an ambient variable are detected in a simple manner since the sensor line extends over the entire length of the charging current line 29.

The sensor line 2 is preferably used for monitoring the temperature of the charging cable 24. For this purpose, the evaluation unit 20 and the control device are integrated into the charging column 26, for example, as is illustrated in FIG. 5. This enables the charging current LS to be regulated in the event of imminent overheating of the charging cable 24 as a result of the flowing charging current LS. For this purpose, the evaluation unit 20, the control device 22 and the charging device 28 are interconnected with one another in such a way that the signal S output by the evaluation unit 20, depending on the intensity of the coupled-in light L, is detected in the control device 22. Afterward, a reduction closed-loop control for the charging current LS is carried out by the control device 22 on the basis of the signal S. This has the consequence that the charging current LS for charging the battery in the motor vehicle 30 is reduced in the charging device 28. This reduced charging current remains connected until the temperature loading within the charging cable 24 has decreased in such a way that the temperature-dictated outputting of the signal S on account of the lack of coupling of the light L into the second optical waveguide 4b of the sensor line 2 is extinguished. This takes place as soon as the temperature within the charging cable is below the transition temperature of the material M. The temperature monitoring is advantageously connected as set point-actual value closed-loop control. The controlled variable is the transition temperature of the material M or the light coupled into the second optical waveguide 4b.

Alternatively or supplementarily, the control device has a closed-loop control of a cooling power if the monitoring of temperature-regulated cables is involved. Specifically, a constant charging current LS is set and the cooling power is correspondingly controlled by closed-loop or open-loop control. By means of the cooling power, it is therefore ensured that the cable 2 does not exceed a predefined temperature.

Figure 6:
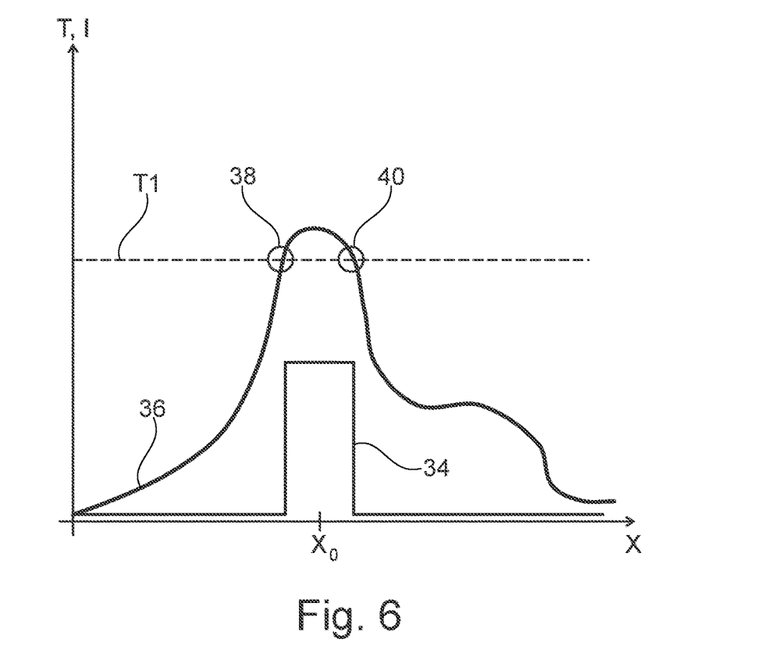
FIG. 6 is a graph showing a profile of the light coupled into the second optical waveguide as a function of a temperature loading.

A graphical elucidation of the principle for detecting the change in an ambient variable, said principle being utilized in the sensor line 2, is illustrated in a simplified fashion in FIG. 6.

In the graph there is a profile 34 of the intensity I of the light L coupled into the second optical waveguide 4b, and also a temperature profile 36 within the sensor line 2. The abscissa axis indicates the length X of the sensor line 2. The temperature T and respectively the intensity I of the coupled-in light L are plotted jointly on the ordinate axis 40. Furthermore, the transition temperature T1 of the material M is depicted as a dashed line.

If consideration is given to the temperature profile 36, upon the exceedance of the transition temperature 38 at a "Hot Spot" X0 the abrupt rise in the light intensity I within the second optical waveguide 4b can be discerned. This has the consequence that, as long as the temperature has a value above the transition temperature T1, light L is coupled into the second optical waveguide. Upon the undershooting of the transition temperature 40, the coupling of light L into the second optical waveguide 4b is extinguished abruptly.

In addition, the binary character of the sensor line 2 is discernible from the profile 34 of the intensity I in the second optical waveguide 4b. This "character" has the advantage that it enables a simple and reliable detection of light in the second optical waveguide 4b.

The invention claimed is:

1. A sensor line for detecting a change in an ambient variable, the sensor line comprising:
   a first optical waveguide;
   a second optical waveguide; and
   a material having a light transmissivity varying in dependence on a value of the ambient variable, said material being positioned between said first optical waveguide and said second optical waveguide such that light is able to be coupled radially from said first optical waveguide into said second optical waveguide depending on the value of the ambient variable, said material is a plastic with thermo chromatic pigments.

2. The sensor line according to claim 1, wherein said material is configured in such a way that the light transmissivity changes abruptly.

3. The sensor line according to claim 1, wherein said material is selected in such a way that the light transmissivity of said material changes in a temperature-dependent manner.

4. The sensor line according to claim 1, wherein said material is selected in such a way that said material changes transparency at a transition temperature of between 40° C. and 90° C.

5. The sensor line according to claim 1, wherein a proportion of said thermo chromatic pigments relative to a mass of said material has a value of between 1% by weight and 10% by weight.

6. The sensor line according to claim 1, further comprising a common sheathing enclosing said first optical waveguide and said second optical waveguide and configured to be reflective.

7. The sensor line according to claim 6, wherein said common sheathing is formed by a metal film.

8. The sensor line according to claim 1, wherein at least said first optical waveguide has a sheath composed of said material.

9. The sensor line according to claim 1, wherein said first optical waveguide and said second optical waveguide are twisted together.

10. The sensor line according to claim 1, wherein at least one of said first and second optical waveguides has an optical fiber and a cladding, wherein a part of said optical fiber is free of said cladding, wherein said material adjoins said part which is free of said cladding.

11. The sensor line according to claim 10, wherein said part of said optical fiber of said first optical waveguide and said part of said optical fiber of said second optical waveguide which are free of said cladding are directed toward one another.

12. The sensor line according to claim 1, wherein said first optical waveguide and said second optical waveguide are embedded into said material.

13. The sensor line according to claim 1, further comprising an outer protective sheath.

14. The sensor line according to claim 1, wherein the sensor line is integrated into a cable to be monitored.

15. The sensor line according to claim 14, wherein the cable is configured as a charging cable for charging a rechargeable battery of an electrically driven vehicle.

* * * * *